(12) United States Patent
Tasson et al.

(10) Patent No.: US 7,407,304 B2
(45) Date of Patent: Aug. 5, 2008

(54) ILLUMINATION DEVICE WITH ARMS THAT OPEN AFTER PASSING THROUGH A HOLE

(76) Inventors: Antonio Tasson, 3925 Stoneham Way, Mississauga, Ontario (CA) L5N 6Y6; Ronny Liao, 33 Fairfax Court, Thornhill, Ontario (CA) M1S 2S7

( * ) Notice: Subject to any disclaimer, the term of this patent is extended or adjusted under 35 U.S.C. 154(b) by 222 days.

(21) Appl. No.: 10/966,323

(22) Filed: Oct. 15, 2004

(65) Prior Publication Data
US 2005/0099810 A1    May 12, 2005

Related U.S. Application Data

(60) Provisional application No. 60/517,946, filed on Nov. 6, 2003.

(51) Int. Cl.
*F21V 21/26* (2006.01)
*F21S 8/10* (2006.01)
(52) U.S. Cl. .................. 362/250; 362/252; 362/429; 362/581; 248/435; 248/168
(58) Field of Classification Search .............. 362/250, 362/252, 371, 372, 429, 581, 249, 402, 427; 411/80.1; 248/435, 168
See application file for complete search history.

(56) References Cited

U.S. PATENT DOCUMENTS

| 2,533,372 | A | * | 12/1950 | Schaeffer et al. ..... 235/144 MG |
| 2,535,372 | A | * | 12/1950 | Schaeffer et al. ............ 362/250 |
| 2,882,547 | A | * | 4/1959 | Bacon ............................ 16/85 |
| 3,241,420 | A | * | 3/1966 | Passer ......................... 411/346 |
| 3,624,385 | A | * | 11/1971 | Wall ............................ 362/565 |
| 3,721,815 | A | * | 3/1973 | Wall ............................ 362/568 |
| 4,603,278 | A | | 7/1986 | Devir et al. .................. 313/318 |
| 5,160,200 | A | | 11/1992 | Cheselske .................... 362/249 |
| 5,595,441 | A | * | 1/1997 | McGee ....................... 362/473 |
| 5,632,551 | A | | 5/1997 | Roney ......................... 362/249 |
| 5,947,588 | A | | 9/1999 | Huang ......................... 362/235 |
| 6,042,242 | A | * | 3/2000 | Chang .......................... 362/86 |
| 6,045,240 | A | | 4/2000 | Hochstein .................... 362/294 |
| 6,371,636 | B1 | | 4/2002 | Wesson ...................... 362/545 |
| 6,523,978 | B1 | * | 2/2003 | Huang ......................... 362/252 |
| 6,598,996 | B1 | | 7/2003 | Lodhie ........................ 326/249 |
| 6,773,140 | B2 | * | 8/2004 | Lee ............................. 362/249 |
| 7,086,756 | B2 | * | 8/2006 | Maxik ......................... 362/249 |
| 2003/0031015 | A1 | * | 2/2003 | Ishibashi ..................... 362/249 |
| 2005/0168999 | A1 | * | 8/2005 | Sommers et al. ............ 362/427 |
| 2005/0248943 | A1 | * | 11/2005 | Tsai ............................ 362/249 |

FOREIGN PATENT DOCUMENTS

GB          2140147 A    * 11/1984

* cited by examiner

*Primary Examiner*—Ismael Negron
(74) *Attorney, Agent, or Firm*—Fay Sharpe LLP

(57) ABSTRACT

An illumination device including at least one arm supporting one or more light emitting devices, such arm pivoting from a closed configuration for passing through a hole to an open configuration for function. In a preferred embodiment, the illumination device includes three or five arms, light emitting diodes (LEDs) as the light emitting devices and, springs for automatically pivoting the arms to the open configuration.

22 Claims, 5 Drawing Sheets

ILLUMINATION DEVICE WITH ARMS THAT OPEN AFTER PASSING THROUGH A HOLE

CROSS REFERENCE TO RELATED APPLICATIONS

This application is based on provisional application Ser. No. 60/517,946, filed on Nov. 6, 2003.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of illumination devices and more specifically to illumination devices where a light bulb or other device is typically installed through an opening into a housing.

The preferred embodiment of the present invention is particularly useful for replacing incandescent lamps used in automobiles, boats, aircraft and other vehicles, where the invention would be applied as a replacement for incandescent bulbs and use light emitting diodes (LEDs) as the source of illumination. Current LED devices produce very directional light emission. The placement and location of these LEDs in a light module should be spread out to maximize the projected effective area of light emission when viewed in operation. The result of spreading out the LEDs produces a light pattern.

The prior art describing incandescent lamps generally describes a glass bulb mounted in a brass bayonet base, a plastic base, or an integrated glass base, all having either single or dual contacts. One type of these incandescent lamps is described in Devir et al., U.S. Pat. No. 4,603,278. Incandescent vehicle lamps have a perceived single point of light emission at the filament. The invention has multiple points of light emission that are distinct and create a light pattern. The preferred embodiment of the invention has provisions for several standard mounting bases having both single or dual contacts.

Lodhie et al., U.S. Pat. No. 6,598,996, Wesson, U.S. Pat. No. 6,371,636, and Cheselske, U.S. Pat. No. 5,160,200 describe an automotive replacement LED lamp with multiple points of light emission from discreet LEDs. The LEDs in these lamps are located in a concentrated small area and in turn cause them to be perceived as a single point of light emission when viewed in operation. The nature of LEDs produces very directional light emission therefore these lamps have a small projected effective area of light when viewed in operation. The function of multiple LEDs in close proximity to each other within a confined area could be limited or prevented by an inability to adequately dissipate the heat produced by the LEDs. The invention has expanding arms that allows the light emitting devices to be spread out causing the projected effective area of light emission to be much larger and form a light pattern. The spread out light emitting devices also allows a much greater ability to dissipate heat.

Roney et al., U.S. Pat. No. 5,632,551 and Hochstein, U.S. Pat. No. 6,045,240 teach one approach to producing a light pattern and providing a large projected effective area of light when viewed in operation. Roney and Hochstien describe an array of LEDs mounted on a large fixed substrate with the LEDs spread out in a pattern. Huang, U.S. Pat. No. 5,947,588 has a similar approach but also incorporates a housing with lens. These lamps are not designed to fit through a standard automotive light module mounting hole and do not fit in standard automotive lamp sockets. The invention collapses to fit through a standard automotive mounting hole and mates to standard lamp sockets.

Examples of lighting fixtures on a single vehicle where the invention may be implemented can include headlights, taillights, turn signals, brake lights, fog lights and other fixtures that will be known to those of skill in the art. Vehicles with such devices include and are not limited to motorcycles, boats, cars, busses, trucks, aircraft and other motorized or non-motorized devices. Other implementations of the invention may include decorative or functional lighting devices such as household or industrial lighting and hand-held flashlights that are designed around or with a bulb-type light source, and the choice of light source for the device is effectively limited by the opening, housing and connector type as configured for the light bulb.

By providing a new type of light source, this invention can provide a variety of lighting patterns with the lighting configured in a manner that will allow adequate heat dissipation. The invention is designed in a manner that allows a portion of the device to expand after installation within the lens, allowing a lighting pattern that is larger than the opening size for installation of a typical bulb. The expanded lighting area can allow multiple lighting patterns to be designed. The mounting portion of the lighting device can be designed for compatibility with existing or future connectors, mounting bases and electrical contact specifications.

BRIEF SUMMARY OF THE INVENTION

The primary object of the invention is to provide an illumination device with arms which fits through a standard light bulb hole in a closed configuration and automatically expands to an open configuration after passing through that hole to display a larger and more varied light pattern than would be available with a normal light bulb.

Another object of the invention is to provide an illumination device that can use multiple light emitting devices such as LEDs to provide a greater amount of lighting than would be available with a single light emitting device.

Another object of the invention is to provide a replacement to a standard light bulb application without modification to the light module containing the bulb or the light module wire harness or other connector.

A further object of the invention is to provide an alternative light pattern to an automotive light module.

Another object of the invention is to provide a distributed layout for the light sources that will allow one or more individual lighting elements to operate with sufficient thermal heat dissipation to allow proper operation of the device.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an illumination device with arms that open after passing through a hole comprising: an arm or set of arms with a means of supporting one or more light emitting devices, a means for said arms to deploy and/or move from a closed configuration for installation to an open configuration for function, a projected size in the said closed configuration that allows passage through a mounting hole, a socket for mating to an existing wire harness and accepting standard automotive light bulb electrical power, a means to accept and use electrical power with the acceptable voltage and current range provided by the said socket, a means of distributing and optionally adapting electrical power from the said socket to the said arms and attached light emitting devices, a body with a means of supporting the said arms, their motion, said socket, and light emitting devices.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The above described drawing figures illustrate the invention, an illumination device with arms that open after passing through a hole 20 for use in a housing designed for an incandescent light bulb such as the taillight module 81 of an automobile 80 or similar vehicle. In the preferred embodiment, the invention 20 can function as a brake signal, turn signal, taillight, headlight or other application.

Figure 1:
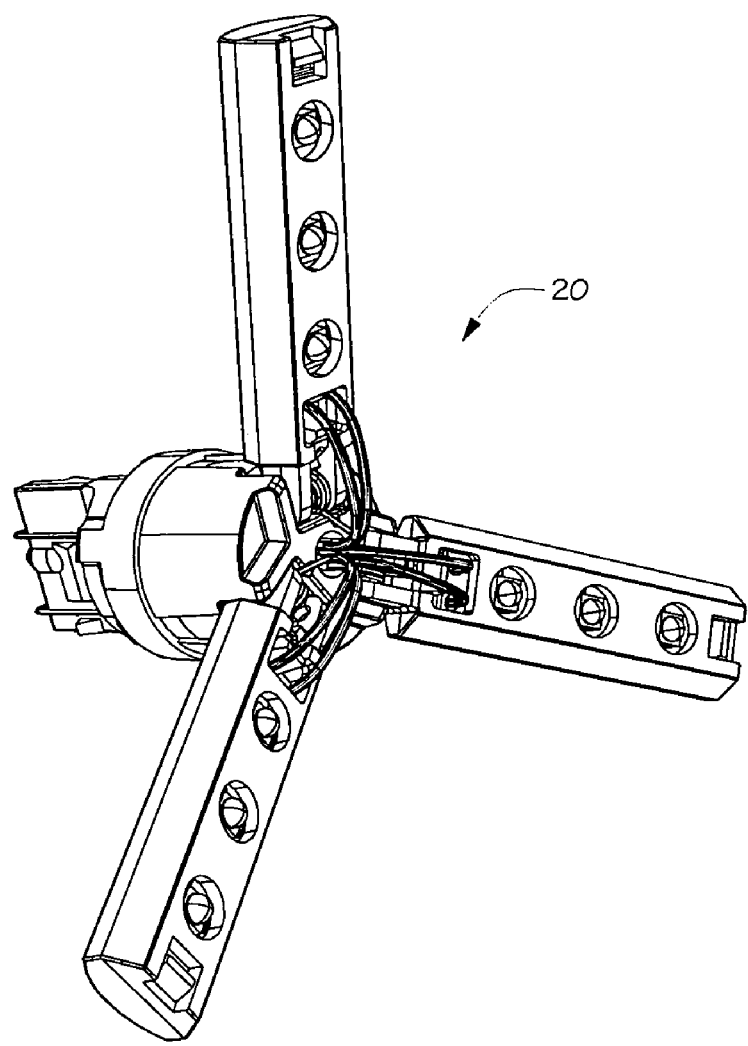
FIG. 1 is a perspective view of the invention with three arms in the open configuration.
Figure 2:
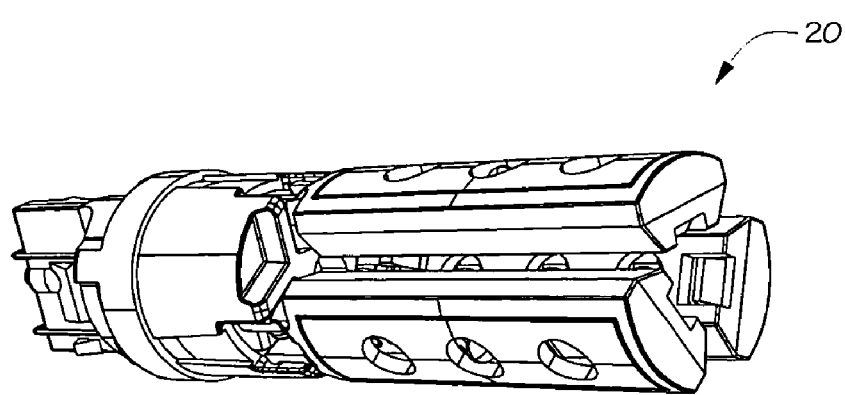
FIG. 2 is a perspective view of the invention with three arms in the closed configuration.
Figure 3:
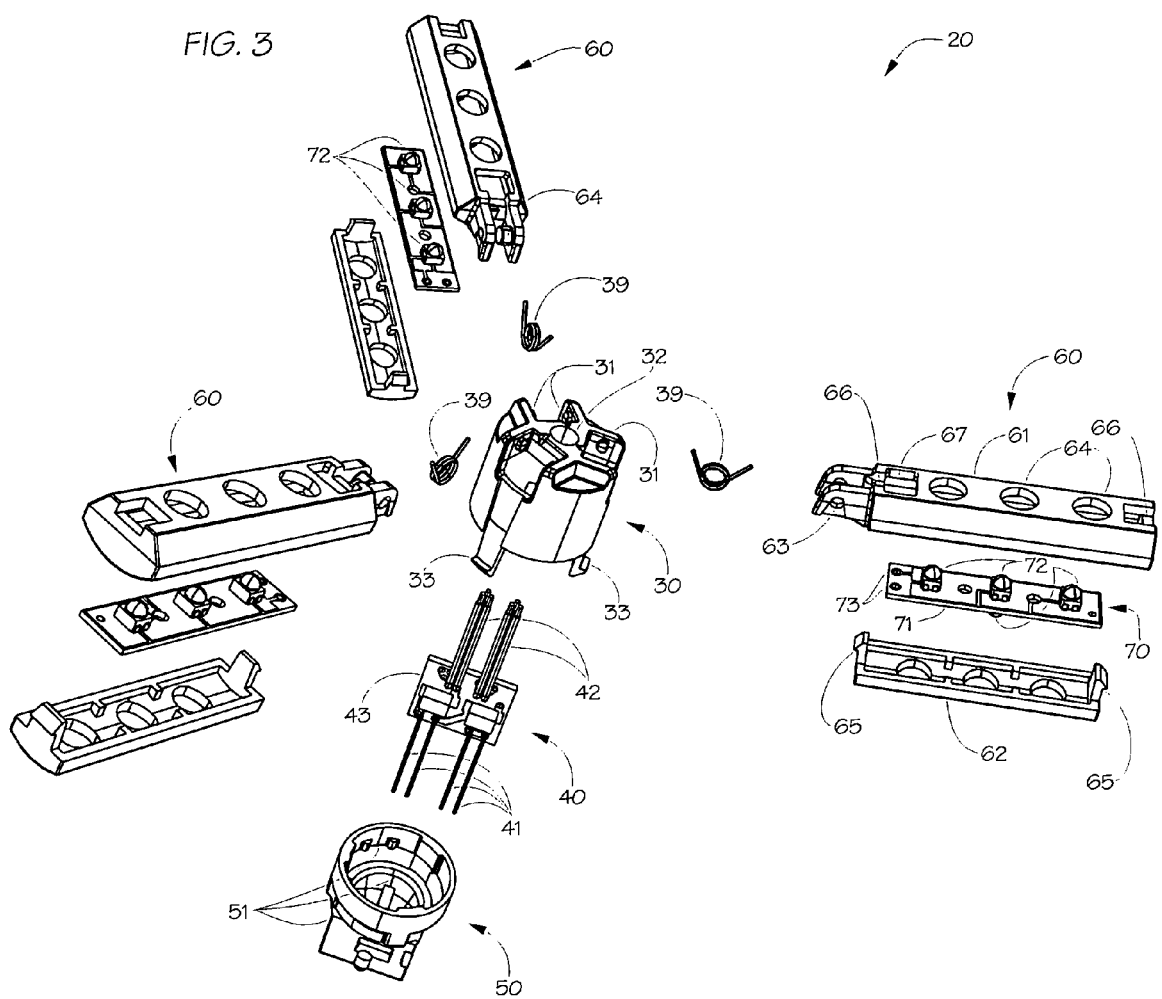
FIG. 3 is an exploded view of the invention.

As shown in FIGS. 1-3, an embodiment of the present invention includes a body 30 that provides a structure to support the arm subassemblies 60 and their motion, the mating socket 50, and tensioning devices to open and hold in place the arms, illustrated in this diagram as a set of springs 39. In this embodiment, the body 30 also houses a base printed circuit board (PCB) 40. The body may also house or support additional light emitting devices.

The PCB 40 is used to distribute and optionally adapt electrical power from the mating socket 50 using the wires 41 and distribute this power to the arm subassemblies 60 using wires 42. The power adaptation may include, but is not limited to, regulating voltage, limiting current, and/or implementing a pulse width modulating generating device. The PCB 40 is installed inside the body 30 with the wires 42 passing through hole 32. The wires 41 on the PCB 40 pass through the mating socket 50 and are bent into position. The mating socket 50 is a standard shape which mates with a connector such as a standard automotive wire harness 90 and wire harness socket 91. The mating socket 50 is fastened into the body 30 using snaps 33 which are retained by walls 51. Other fastening, connection and installation mechanisms may be used and implemented on one or more embodiments of the invention to allow the invention to be used as a replacement or substitute for a variety of bulbs in a variety of applications.

The arm subassembly 60 includes a structural arm 61 that houses the arm printed circuit board (PCB) subassembly 70. The arm PCB 71 may be single or double sided and contains the light emitting devices 72 and can also contain other electrical components, such as resistors (not shown). In the preferred embodiment, the light emitting devices are light emitting diodes (LEDs). The wires 42 pass through window 67 in the arm 61 and are electrically connected to the holes 73 in the arm PCB 71. The arm closeout 62 is used to retain the arm PCB subassembly 70. The arm closeout 62 is fastened to the arm 61 using snaps 65 which are retained by walls 66. The spring 39 in held in place by pin 64. The arm subassembly 60 mates to the body 30 using the trunnions 31 and holes 63. The arm subassembly 60 is free to pivot about the axis of the trunnion 31. The spring 39 applies a force on the arm subassembly 60 that causes the arm subassembly 60 to be in the open configuration as shown in FIG. 1.

Figure 4:
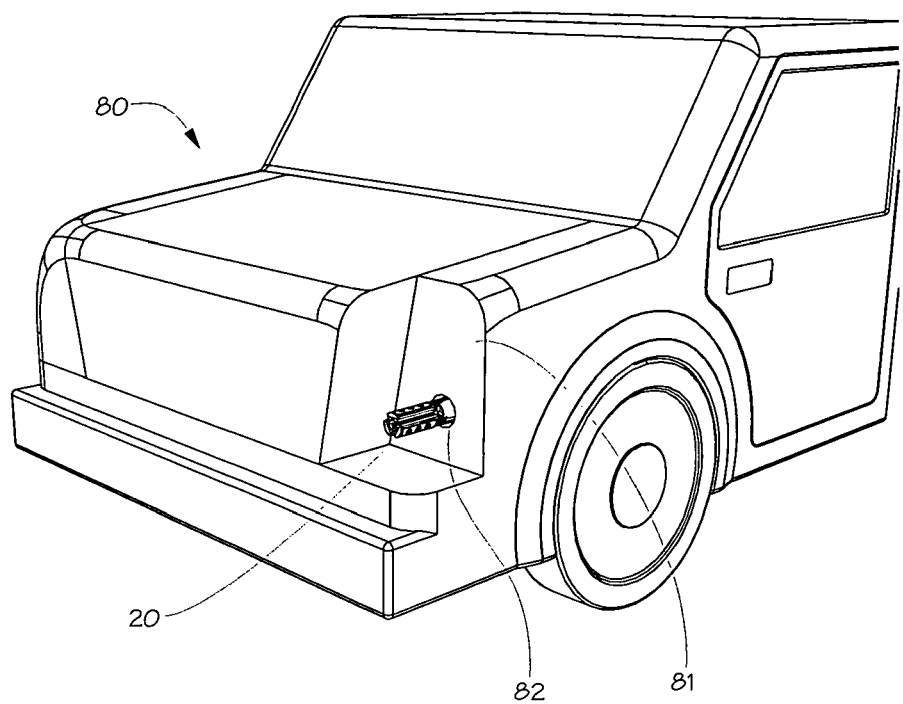
FIG. 4 is a perspective view of the invention installed in the taillight module of a vehicle with arms in a closed position.
Figure 5:
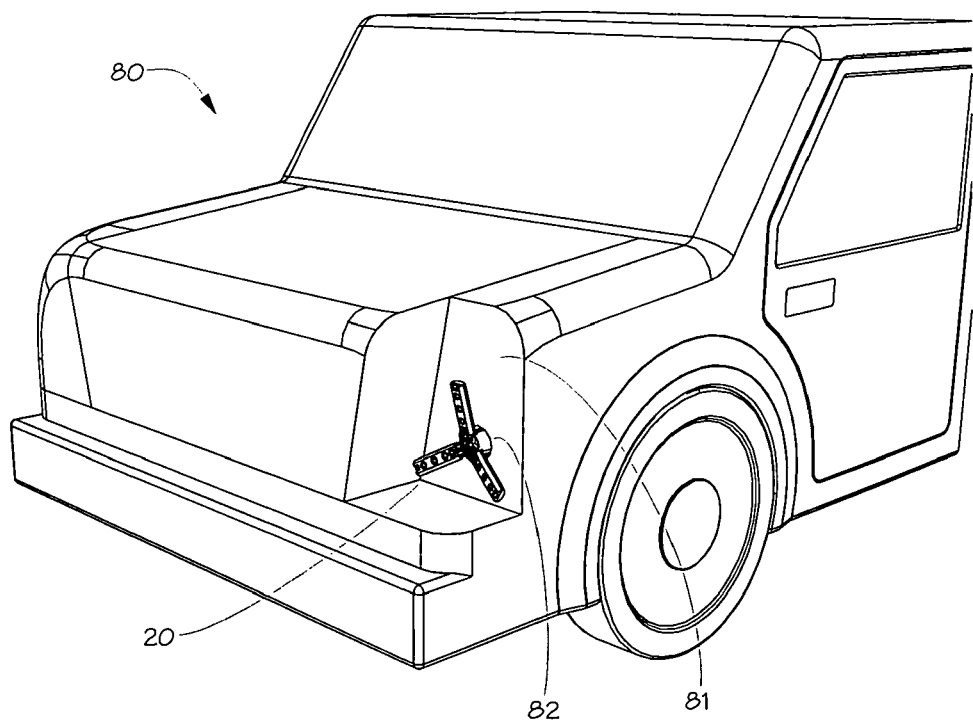
FIG. 5 is a perspective view of the invention installed in the taillight module of a vehicle with arms in an open configuration.
Figure 6:
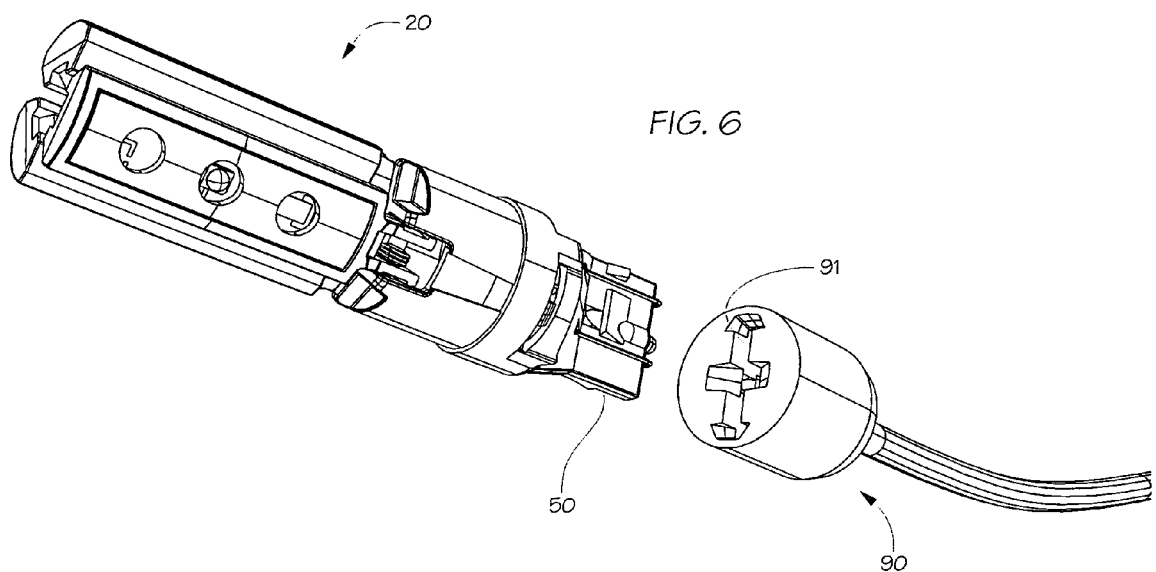
FIG. 6 is a perspective view of the invention showing how it would interface with an existing wire harness of a light module.

To accomplish an important function of the invention, there is shown in FIGS. 4 and 5 the installation of the invention in a motor vehicle 80. The invention 20 is put into the closed configuration as shown in FIG. 2. The closed configuration causes the invention 20 to have a projected size that allows passage through a standard mounting hole 82 in a typical lighting module 81 (shown without outer lens). Once the invention 20 passes through the mounting hole 82, the arm subassemblies 60 automatically pivot to the open configuration as is shown if FIG. 5. The open configuration allows the light emitting devices to be spread out and in turn produces a distinct and discrete light pattern that has a large projected effective area when viewed in operation.

The length and size of the arms is specified to allow their expansion into the bulb housing internal volume after passing through the mounting hole. Embodiments of the invention may therefore have arms of different widths and lengths to accommodate a variety of bulb housings. Even within the same embodiment of the device, the arms may have different lengths to accommodate housings with asymmetrical bulb housings or bulb housings that may contain one or more restrictions. Furthermore, the location of the arms on the body is not necessarily evenly distributed or symmetrical.

Figure 7:
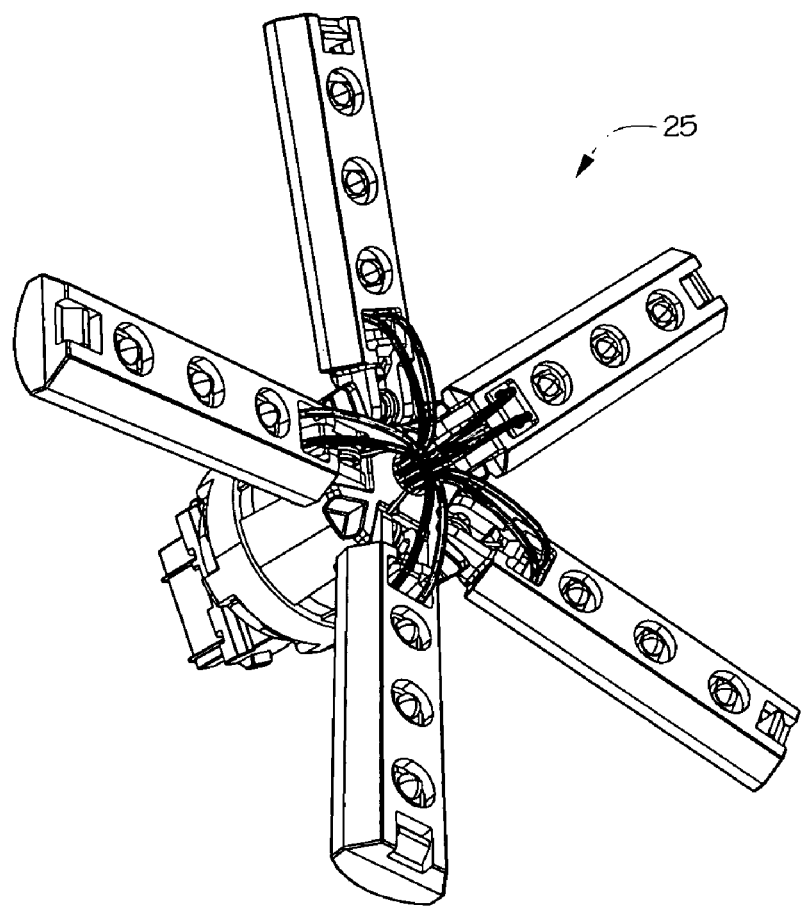
FIG. 7 is a perspective view of the invention with five arms in the open configuration.
Figure 8:
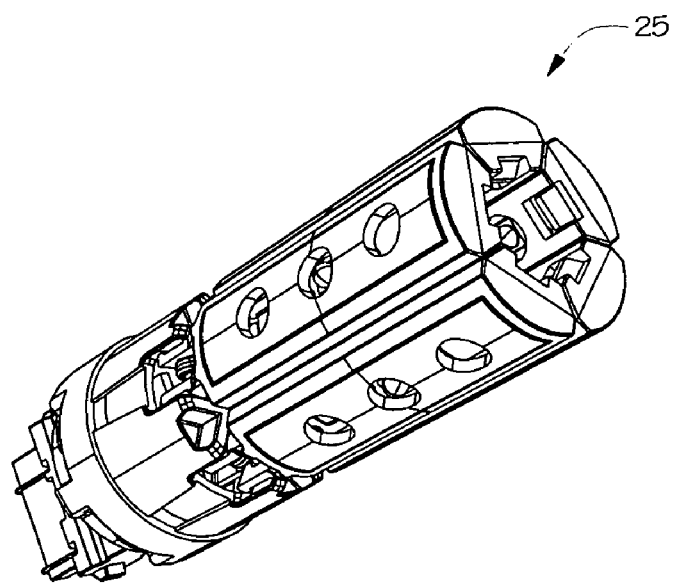
FIG. 8 is a perspective view of the invention with five arms in the closed configuration.

In FIGS. 7 and 8, the invention 25 is shown with an alternative number of arm subassemblies 60. Other alternative embodiments may include the following elements; a projected size in a closed configuration that is greater than or different from a standard automotive light bulb which allows it to pass through a modified light bulb mounting hole; other means of deploying and maintaining in the deployed position the arms that may include a rotational gear mechanism, pins to be inserted or moved into position, or other mechanisms as will occur to those skilled in the art; a non-standard mating socket which will fit a modified light bulb wire harness; a non-standard mating socket that accepts standard automotive electrical power through an adapter or other third-party device; hook up wires that transmit electrical power from the wire harness and distributes it directly to the arms; an alternative substrate, such as metal strips, on each arm with light emitting devices on one or both sides.

The distribution and control of the light emitting devices on the arms may be done in a manner that allows individual activation of any given light source, and the intensity of light from each of the devices to be varied. In this manner, a given set of LEDs on the arms can be actuated to display a variety of patterns with varying timing.

Additional means may be provided to allow an operator to select a display pattern, or set the timing of display patterns. In such an instance, the connector, power distribution and PCBs would be able to handle and use command and control signals from one or more input devices.

While the lighting devices will typically use electrical power, other types of lighting devices and power sources may be used within the invention. For example, optical fibers or light pipes may be used to deliver the illumination to the arms. Other power sources and lighting devices may occur to those of skill in the art.

While the embodiments described herein are primarily for replacement of bulbs for existing applications, new applications, fixtures and connectors may be specifically designed to use embodiments of the invention described herein.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An illumination device for installation in a housing though an aperture in the housing, said device comprising:
    a body;
    at least two rigid arms pivotally attached to said body and moveable between a closed configuration for installation through the aperture and an outwardly open configuration for function within the housing;
    a means for biasing the arms toward the open configuration;
    a plurality of light emitting devices supported on each of the arms;
    a socket associated with the body, said socket for connecting the device to a power source; and
    a circuit board mounted in the base, the circuit board being connected with the socket and the light emitting devices and including circuitry configured for adapting power from the power source to allow at least one of the intensity, duration, frequency and timing of illumination of the light-emitting devices to be varied to create random or pre-determined lighting patterns;
    wherein said arms are movable to the closed configuration to permit said device to pass through the aperture, and once through, said biasing means causes said at least two arms to move to the open configuration.

2. The device of claim 1, further comprising a plurality of said light emitting devices on each arm which in said open configuration are spread out and form a distinct light pattern.

3. The device of claim 1, wherein the power source is electrical.

4. The device of claim 1, wherein the light emitting device is optical.

5. The device of claim 1, wherein said arms are sized to allow installation and deployment within a tail or brake light housing.

6. The device of claim 1, further comprising:
    an additional circuit board mounted on each of the at least two arms and supporting a plurality of light emitting devices, and
    a means of transmitting power from the socket to the LEDs via the additional circuit boards.

7. The device of claim 1, wherein in the open configuration the arms extend outwardly from the body and are spaced radially about the body.

8. An illumination device for installation in a housing though an aperture in the housing, said device comprising:
    a support body including a mating socket configured to connect the illumination device to an electrical power source; and
    a plurality of elongate arm sub-assemblies each including a plurality of light emitting diodes mounted on a circuit board electrically connected with the socket to receive electrical power to operate the light emitting diodes; and
    tensioning devices connecting first ends of the elongate arm sub-assemblies to the support body, the tensioning devices biasing the elongate arm sub-assemblies into an open operational configuration in which second ends of the elongate arm sub-assemblies opposite the first ends are extended away from the support body, the open operational configuration not fitting through the aperture in the housing, the elongate arm sub-assemblies being movable against the bias into a closed installation configuration in which the second ends of the elongate arm sub-assemblies are brought into proximity to each other to fit through the aperture in the housing for installation in said housing.

9. The illumination device as set forth in claim 8, wherein the tensioning devices comprise a set of springs.

10. The illumination device as set forth in claim 8, wherein the mating socket has a standard shape which mates with a standard automotive wire harness.

11. The illumination device as set forth in claim 8, further comprising:
    additional light emitting devices housed or supported by the support body.

12. The illumination device as set forth in claim 8, wherein the plurality of elongate arm sub-assemblies have at least one of (i) different widths and (ii) different lengths.

13. An illumination device for installation in a housing though an aperture in the housing, said device comprising:
    a body;
    a plurality of rigid arms pivotally attached to said body and on which are mounted a plurality of light emitting devices (LEDs), the rigid arms being moveable between a closed configuration which presents a reduced cross-section for installation through the aperture and an open, operational configuration which presents an expanded cross-section within the housing;
    a means for biasing the arms toward the open configuration;
    a socket associated with the body, said socket being configured for connecting the device to a power source; and
    a means of transmitting power from the socket to the plurality of LEDs, the power transmitting means including a circuit board mounted to each arm and supporting the LEDs mounted on that arm, the circuit boards being connected with the socket, the power transmitting means further including components configured for adapting the power source to the required operating characteristics of the LEDs to allow at least one of the intensity, duration, frequency, and timing of illumination of the plurality of LEDs to be varied to create random or predetermined lighting patterns;

wherein said arms are movable to the closed configuration to permit said device to pass through the aperture, and once through, said biasing means causes said arms to move from the closed configuration to the open configuration.

14. The device of claim 13, wherein the device is sized in the closed configuration to pass through a standard mounting hole of an automotive tail light assembly housing.

15. The device of claim 13, wherein said LEDs are positioned on said arm to ensure that the amount of heat to be dissipated from a specific area of the device does not exceed a pre-determined threshold.

16. The device of claim 13, wherein the plurality of rigid arms comprises:
at least three arms each pivotally attached to said body and moveable between the closed configuration for installation through the aperture and the open configuration within the housing in which the arms extend radially.

17. An illumination device, said device comprising:
a body with a generally cylindrical cross-section;
at least two rigid arms attached to an upper end of said body, each having at least one light emitting device;
a pivot for each arm to permit each arm to pivot upward from said body from a closed configuration in which the arms are generally parallel and have a cross-section equal to or less than the cross-section of the base to precede the base through an aperture in a housing for installation to an open configuration extending outward from the base for function;
a means to bias said at least two arms to said open configuration;
a socket formed on a lower end of said body configured for connecting the device to an electrical source providing control and power to the light emitting device;
a means of transmitting power to each of the light emitting devices;
said arms being movable to the closed configuration against a biasing force of the biasing means configured to permit said device to pass through a hole, and once through, said biasing means is configured for causing said arms to move to the open, outward extending configuration.

18. An illumination device for installation in a housing though an aperture in the housing, said device comprising:
a generally circular body including a socket configured to connect the illumination device to an electrical power source; and
a plurality of biased rigid arms supporting light emitting devices, the light emitting devices being electrically connected with the socket to receive operative electrical power therefrom, the biased rigid arms being biased into an open operational configuration in which the biased rigid arms are positioned extended away from the generally circular body and do not fit through the aperture in the housing, the biased rigid arms being movable by force against the bias into a closed installation configuration in which the biased rigid arms precede the base and fit into the aperture to enter the housing for installation, the biased rigid arms automatically returning to the open operational configuration once the biased rigid arms pass through the aperture and the force against the bias is removed.

19. The illumination device as set forth in claim 18, wherein the light emitting devices comprise light emitting diodes.

20. An illumination device for installation in a housing though an aperture in the housing, said device comprising:
a plurality of elongate arm sub-assemblies each including a plurality of light emitting diodes; and
a support body including a mating socket configured to accept standard automotive electrical power and a printed circuit board configured to adapt the standard automotive electrical power to operative power distributed via wires to the plurality of light emitting diodes on the elongate arm sub-assemblies; and
tensioning devices connecting first ends of the elongate arm sub-assemblies to the support body, the tensioning devices biasing the elongate arm sub-assemblies into an operational configuration in which second ends of the elongate arm sub-assemblies opposite the first ends are extended away from the support body, the elongate arm sub-assemblies in the operational configuration not fitting through the aperture in the housing, the elongate arm sub-assemblies being movable against the bias into a closed installation configuration in which the second ends of the elongate arm sub-assemblies are brought together to fit through the aperture in the housing for installation in said housing.

21. The illumination device as set forth in claim 20, wherein the printed circuit board is configured to perform at least one adaptation of the standard automotive electrical power to operative power selected from the group consisting of: (i) regulating electrical voltage, (ii) limiting electrical current, and (iii) implementing a pulse width modulation adaptation.

22. The illumination device as set forth in claim 20, wherein the illumination device is configured to function as at least one of an automotive brake signal, an automotive turn signal, and an automotive taillight.

* * * * *